(No Model.)

D. T. YOUNG.
HOSE CARRIAGE.

No. 344,705. Patented June 29, 1886.

Witnesses
J. C. Hills,
Wm. S. Duvall.

Inventor
D. T. Young.
By his Attorney
E. B. Stocking

N. PETERS, Photo-Lithographer, Washington, D. C.

United States Patent Office.

DAVID T. YOUNG, OF DAVENPORT, IOWA.

HOSE-CARRIAGE.

SPECIFICATION forming part of Letters Patent No. 344,705, dated June 29, 1886.

Application filed January 12, 1886. Serial No. 188,288. (No model.)

*To all whom it may concern:*

Be it known that I, DAVID T. YOUNG, a citizen of the United States, residing at Davenport, in the county of Scott, State of Iowa, have invented certain new and useful Improvements in Hose-Carriages, of which the following is a specification, reference being had therein to the accompanying drawings.

This invention has relation to hose-carriages, referring more particularly to the mechanism for operating the reel, the object being to so construct the carriage, reel, and reel-operating mechanism that the latter may be accessible without the necessity of inserting the winding-crank between the spokes of the wheel, while at the same time the reel with its load of hose will be arranged in close proximity to the rear axle of the carriage.

With this object in view the invention consists in certain features of construction hereinafter specified, and particularly pointed out in the claims.

Figure 1:
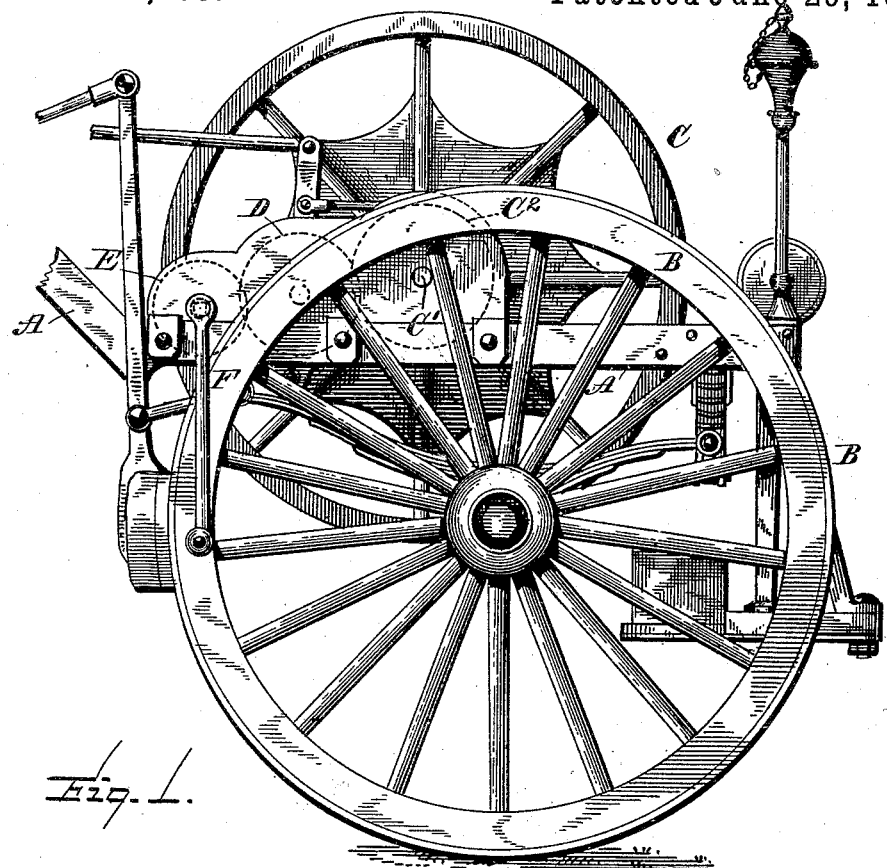
Figure 2:
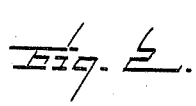
Figure 3:
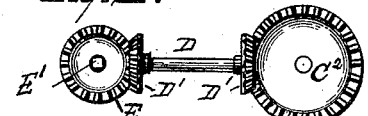
Figure 4:
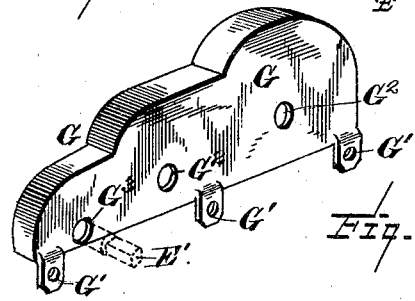
Figure 4:
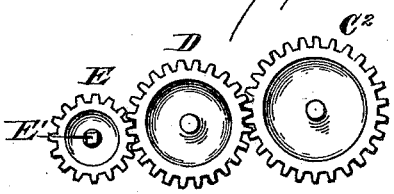

Referring to the drawings, Figure 1 is a side elevation of the rear portion of a four-wheeled carriage provided with my improvement. Fig. 2 is a perspective of the gear-box. Fig. 3 is a side elevation of a train of gearing, and Figs. 4 and 5 are modifications hereinafter referred to.

Like letters of reference indicate like parts in all the figures of the drawings.

Heretofore the crank employed to rotate the hose-reel has necessarily been either coupled onto the shaft of the reel or to a pinion meshing with a gear on the reel-shaft by inserting the crank-shaft through the spokes of the wheel or above the wheel. In the first instance it often is necessary to move in one direction or the other in order to bring the spokes from in front of the crank-shaft, and to remove the crank whenever it is desired to change the position of the carriage, and in the second instance the crank-shaft and crank are so high that it renders the labor of winding the hose upon the reel exceedingly difficult and tiresome. I arrange a system of gearing extending from the reel-shaft preferably forward, and provide the terminal gear of the system with a crank-shaft, which projects laterally and in front of the wheel, so that while I still retain the weight of the reel and the hose thereon at a desired point above the rear axle of the truck, as heretofore, I also secure the advantage of a lower point of attachment for the crank and one free from obstruction to a rotation of the wheel.

In the drawings, A represents the framework of a carriage—in this instance the rear portion of a four-wheeled carriage; but it is apparent that my invention is also applicable to two-wheeled trucks.

B represents one of the rear wheels, and C the reel, the shaft C' of which is mounted in suitable bearings secured to the frame-work, and is provided with a gear, $C^2$. (Shown by dotted lines in Fig. 1.) An intermediate gear, D, is mounted in suitable bearings on the carriage-frame—in this instance, in front of and in line with the gears $C^2$—and a terminal gear, E, is also provided, meshing with the gear D. The shaft E' of the terminal gear E is squared or otherwise adapted to receive the crank F, which, when mounted on the shaft E', is adapted to be rotated in a vertical plane entirely outside of that of the wheel.

A boxing, G, is provided, having attaching lugs G', whereby it may be secured to the framework A. Said boxing may or may not also be provided with openings $G^2$, for the bearings of the reel-shaft and the intermediate gear. It has in this instance also an opening, $G^3$, for the crank-shaft E'.

If desired, the intermediate gear, D, may be dispensed with and sprocket-wheels $C^2$ E may be substituted for the gear-wheels above described, and a sprocket-chain, D, may be substituted for the intermediate gear, whereby the rotation of the sprocket or terminal gear-wheel E, occasioned by the crank F, is communicated to the reel C. In Fig. 5 bevel-gears E, D' D', and $C^2$, and a shaft, D, are shown as equivalents of the other gearing, before described, and either may be employed.

I am aware that gearing-belts and endless chains have been used to connect hose-reels with traction-wheels of the truck or carriage, for the purpose of winding the hose upon the reel, by drawing the truck or carriage over the ground, and I do not claim such as of my invention.

Having described my invention and its operation, what I claim, and desire to secure by Letters Patent, is—

1. The gear guard or boxing G, having attaching-lugs G' and bearings G², in combination with the frame-rail A and gearing E D C², substantially as specified.

2. The combination of the reel C and gears C' D E, shaft E', boxing G, crank F, and wheel B, substantially as specified.

In testimony whereof I affix my signature in presence of two witnesses.

DAVID T. YOUNG.

Witnesses:
DAN. W. W. TATE,
GEO. H. YOUNG.